United States Patent
Jamart

(10) Patent No.: US 11,865,812 B2
(45) Date of Patent: Jan. 9, 2024

(54) GLASS SHEET COATED WITH A LAYER OF MINERAL PAINT AND WITH A THIN LAYER STACK

(71) Applicant: SAINT-GOBAIN GLASS FRANCE, Courbevoie (FR)

(72) Inventor: Juliette Jamart, Compiegne (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 276 days.

(21) Appl. No.: 17/417,247

(22) PCT Filed: Feb. 20, 2020

(86) PCT No.: PCT/EP2020/054477
§ 371 (c)(1),
(2) Date: Jun. 22, 2021

(87) PCT Pub. No.: WO2020/169732
PCT Pub. Date: Aug. 27, 2020

(65) Prior Publication Data
US 2022/0055350 A1    Feb. 24, 2022

(30) Foreign Application Priority Data
Feb. 22, 2019   (FR) ...................................... 1901815

(51) Int. Cl.
*B32B 3/00*     (2006.01)
*B32B 17/10*    (2006.01)
*C03C 17/00*    (2006.01)
*C03C 17/36*    (2006.01)

(52) U.S. Cl.
CPC .. *B32B 17/10348* (2013.01); *B32B 17/10036* (2013.01); *B32B 17/10174* (2013.01); *B32B 17/10889* (2013.01); *C03C 17/007* (2013.01); *C03C 17/3644* (2013.01); *C03C 17/3655* (2013.01); *C03C 17/3681* (2013.01); *C03C 2217/231* (2013.01); *C03C 2217/256* (2013.01); *C03C 2217/475* (2013.01); *C03C 2217/948* (2013.01); *C03C 2218/119* (2013.01); *C03C 2218/156* (2013.01)

(58) Field of Classification Search
CPC ........ B32B 17/10036; B32B 17/10174; B32B 17/10045; B32B 17/10247
See application file for complete search history.

(56) References Cited

U.S. PATENT DOCUMENTS

| | | | |
|---|---|---|---|
| 5,028,759 A | 7/1991 | Finley | |
| 2014/0272338 A1 | 9/2014 | Vandal et al. | |
| 2017/0272338 A1* | 9/2017 | Borrel | H04W 4/023 |
| 2017/0361576 A1* | 12/2017 | Legrand | B32B 17/10788 |
| 2018/0098386 A1* | 4/2018 | Masschelein | B32B 17/10036 |

FOREIGN PATENT DOCUMENTS

| | | | |
|---|---|---|---|
| CN | 1434787 A | 8/2003 | |
| CN | 102164870 A | 8/2011 | |
| DE | 1496554 A1 | 5/1969 | |
| EP | 0 353 141 A1 | 1/1990 | |
| FI | 893581 | 7/1989 | |
| FR | 3 051 716 A1 | 12/2017 | |
| WO | WO 2014/164240 A1 | 10/2014 | |
| WO | WO 2017/203123 A1 | 11/2017 | |

OTHER PUBLICATIONS

International Search Report as issued in International Patent Application No. PCT/EP2020/054477, dated May 8, 2020.
First Office Action as issued in Chinese Patent Application No. 202080001413.5, dated Feb. 28, 2022.

* cited by examiner

*Primary Examiner* — Elizabeth E Mulvaney
(74) *Attorney, Agent, or Firm* — Pillsbury Winthrop Shaw Pittman LLP

(57) ABSTRACT

A material includes a glass sheet, one of the faces of which includes a first zone and a second zone, only the first zone being coated with a layer of opaque mineral paint obtained from a water-based paint composition including pigments and an aqueous solution of alkaline silicate, the layer of mineral paint and the second zone of the glass sheet being coated with a thin layer stack including at least one electrically conductive thin layer.

20 Claims, No Drawings

GLASS SHEET COATED WITH A LAYER OF MINERAL PAINT AND WITH A THIN LAYER STACK

CROSS-REFERENCE TO RELATED APPLICATIONS

This application is the U.S. National Stage of PCT/EP2020/054477, filed Feb. 20, 2020, which in turn claims priority to French patent application number 1901815 filed Feb. 22, 2019. The content of these applications are incorporated herein by reference in their entireties.

The invention relates to the field of glazing, in particular glazing for motor vehicles, such as motor vehicle windshield or sunroof glazing.

Such glazing is often laminated glazing, in which two sheets of glass are adhesively bonded by means of a lamination interlayer. This interlayer in particular enables the fragments of glass to be held in the event of breakage, but also provides other functionalities, in particular in terms of resistance to forced entry or improvement of the acoustic properties.

Glazing of this type often comprises coatings of various types, intended to impart different properties.

Layers of enamel, generally black and opaque, are often deposited on part of the glazing, generally in the form of a peripheral band intended to conceal and to offer ultraviolet radiation protection to the polymeric seals serving for fixing and positioning the glazing to the opening in the bodywork. In a laminated glazing, these layers of enamel are generally arranged on face 2, the faces conventionally being numbered starting from the face intended to be positioned to the exterior of the vehicle. Face 2 is thus a face in contact with the lamination interlayer. The esthetic appearance of the layer of enamel viewed from the exterior of the vehicle is of particular importance for motor vehicle manufacturers. The enamel is generally obtained by firing above 500° C. a composition comprising a glass frit and pigments. The firing step is generally performed simultaneously with the bending of the glass sheet.

Coatings, generally in the form of thin layer stacks, may also be present on one of the glass sheets of the laminated glazing. They may notably be electrically conductive layers, which may provide two types of functionalities. The electrically conductive layers can, firstly, when current supplies are provided, dissipate heat by means of the Joule effect. These are then heated layers, which are useful, for example, for deicing or demisting. These layers have, secondly, by means of their reflection of infrared radiation, solar control or low-emissivity properties. The layers are then appreciated for the improvement in the thermal comfort or for the energy savings they afford, by reducing the consumption intended for heating or air conditioning. These stacks of layers are generally arranged on face 3 of the laminated glazing, thus also in contact with the lamination interlayer.

It may be advantageous in certain cases to arrange the layer of enamel and the thin layer stack on the same glass sheet, and thus on the same face of the glass sheet under consideration so that these coatings are protected inside the laminated glazing. The enamel may be deposited on the thin layer stack, but the possible interactions that may take place between the two coatings during the firing of the enamel may harm the esthetic appearance of the enamel. Another possibility is to deposit the thin layer stack on the enamel. It is then necessary to perform prefiring of the enamel and to rigorously control its roughness. The remelting of the enamel during the firing step and the interactions which may then take place with the thin layer stack may, however, degrade the esthetic appearance of the enamel and/or the electrical conductivity properties of the stack.

The aim of the invention is to overcome these drawbacks by proposing a solution which makes it possible to combine good esthetics with good electrical conductivity properties.

To this end, one subject of the invention is a material comprising a glass sheet, one of the faces of which comprises a first zone and a second zone, only the first zone being coated with a layer of opaque mineral paint obtained from a water-based paint composition comprising pigments and an aqueous solution of alkaline silicate, the layer of mineral paint and the second zone of the glass sheet being coated with a thin layer stack comprising at least one electrically conductive thin layer.

A subject of the invention is also a process for obtaining a material according to the invention, comprising the following steps:
  providing a glass sheet, one of the faces of which comprises a first zone and a second zone, and then
  a step of depositing onto the first zone a water-based paint composition comprising pigments and an aqueous solution of alkaline silicate, and then
  a step of prefiring at a temperature of at least 200° C., so as to obtain a layer of mineral paint, and then
  a step of depositing, onto the layer of mineral paint and onto the second zone of the glass sheet, a thin layer stack comprising at least one electrically conductive thin layer.

Another subject of the invention is a laminated glazing, notably for a motor vehicle windshield or sunroof, comprising a material as described previously, adhesively bonded to an additional glass sheet by means of a lamination interlayer, so that the layer of mineral paint and the thin layer stack are turned toward said interlayer.

A subject of the invention is also a process for obtaining such a laminated glazing, comprising the following steps:
  providing a material obtained according to the process described previously and an additional glass sheet, and then
  a step of bending, notably simultaneous, of the material and of the additional glass sheet, and then
  a step of laminating said material with the additional glass sheet by means of a lamination interlayer, so that the layer of mineral paint and the thin layer stack are turned toward said interlayer.

In the text hereinbelow, the layer of mineral paint and the thin layer stack are collectively referred to as "the coatings".

The glass sheet of the material according to the invention is preferably made of soda-lime-silica glass. It is advantageously obtained by floating. Other glass compositions are, however, possible, for example compositions of borosilicate or aluminosilicate type.

The glass sheet may be made of clear glass or tinted glass, preferably of tinted glass, for example green, gray or blue. To do this, the chemical composition of the glass sheet advantageously comprises iron oxide, in a weight content ranging from 0.5% to 2%. It may also comprise other coloring agents, such as cobalt oxide, chromium oxide, nickel oxide, erbium oxide or selenium.

The glass sheet preferably has a thickness of between 0.7 and 5 mm, notably between 1 and 4 mm, or even between 1.5 and 3 mm.

The lateral dimensions of the glass sheet are to be adapted as a function of those of the laminated glazing with which it is intended to be integrated. The glass sheet preferably has an area of at least 1 m$^2$.

The dimensions of the glass sheet may depend on the step of the process under consideration. According to a first embodiment, the steps of depositing the coatings are performed on a "primary", i.e. a glass sheet which already has dimensions such that it will not have to undergo a cutting step before the bending and lamination. According to a second embodiment, the steps of depositing the coatings are performed on a large-sized glass sheet (for example having an area of between 6 and 20 m$^2$, notably of about 3×6 m$^2$ or 3×3 m$^2$). Several laminated glazings can then be made from the material obtained. In this case, a cutting step is performed before bending and laminating. After cutting, the original glass sheet is subdivided into n glass sheets, n typically being from 2 to 5, notably 3 or 4.

The glass sheet may be flat or bent. It is generally flat during the steps of depositing the paint composition and the thin layer stack. It is then preferably bent before the lamination step, and thus has a bent shape in the final glazing.

The first zone is the zone coated with the layer of mineral paint. The first zone preferably represents between 2% and 25%, notably between 3% and 20% or even between 5% and 15% of the area of the coated face. In the final material, before integration or integrated into the laminated glazing, the first zone is preferably in the form of a peripheral strip. The term "peripheral strip" means a strip closed up on itself, which, from each point of the periphery of the glass sheet, extends toward the interior of the glass sheet over a certain width, typically between 1 and 20 cm.

In this case also, the shape of the first zone may depend on the step of the process under consideration, insofar as cutting steps may take place after the deposition of the coatings and before bending.

In the first embodiment described above (deposition on a primary), the first zone, during the deposition of the coatings, is preferably in the form of a peripheral strip.

In the second embodiment described above (deposition on a large sheet), the first zone, during the deposition of the coatings, preferably comprises several, notably n, disconnected strips closed up on themselves, n typically being from 2 to 5, notably 3 or 4. After cutting, n materials are obtained, each having a first zone in the form of a peripheral strip, which materials may be bent and then integrated into the laminated glazing.

Preferably, the first zone and the second zone together represent the total area of one of the faces of the glass sheet.

The layer of mineral paint is preferably in contact with the glass sheet.

The layer of paint is preferably black. In particular, the lightness L* measured in reflection on the glass side (i.e. on the side opposite the layer of mineral paint) is preferably less than 5, notably less than 3. The measurement is taken using a spectrocolorimeter, and the calculation is performed taking into consideration the illuminant D65 and the CIE 1964 reference observer (10°).

The thickness of the layer of mineral paint is preferably between 2 and 20 µm, notably between 3 and 15 µm, or even between 4 and 10 µm. It is, in this instance, the thickness of the final layer, after firing.

The layer of mineral paint is obtained from a water-based paint composition comprising pigments and an aqueous solution of alkaline silicate.

At least one, notably each, pigment is preferably based on an oxide or sulfide of iron, chromium, copper, cobalt and/or manganese.

The aqueous solution of alkaline silicate preferably comprises at least one sodium, potassium and/or lithium silicate. The aqueous solution of alkaline silicate may consist of a mixture of aqueous solutions of different alkaline silicates, for example a mixture of at least one aqueous solution of sodium and of at least one aqueous solution of potassium.

The paint composition preferably comprises at least one mineral filler, notably chosen from colloidal silica, feldspars, alumina and lamellar fillers. The lamellar fillers are preferably chosen from talc, mica and clays, notably clays based on silicate or on aluminosilicate such as kaolinite, illinite, montmorillonite and sepiolite. The paint composition advantageously comprises a mixture of several of these mineral fillers.

The mineral fillers and the pigments preferably have a particle size distribution (by volume) such that their d90 is less than 10 µm.

The paint composition may also comprise a base, notably an alkaline hydroxide.

The paint composition may also contain various additives, such as at least one dispersant, at least one antifoam, at least one thickener, at least one stabilizer and/or at least one curing agent.

In the layer of mineral paint, the weight content of alkaline silicate is preferably between 7% and 60%, notably between 15% and 55%. The total weight content of pigments and mineral fillers is preferably between 20% and 90%, notably between 30% and 70%. The total content of additives is preferably between 0.1% and 5%.

These contents are also valid for the water-based paint composition (it is then a percentage relative to the solids content).

The layer of mineral paint (after prefiring) thus comprises alkaline silicate and pigments, and, where appropriate, mineral fillers.

The layer of mineral paint is preferably deposited by screen printing. The step of depositing the paint composition is then performed by screen printing. Screen printing involves the deposition, notably using a doctor blade, of a fluid composition onto the glass sheet through the mesh of a screen printing screen. The mesh of the screen is closed off in the part corresponding to the zones of the glass sheet that it is not desired to coat, so that the fluid composition can pass through the screen only in the zones to be printed, according to a predefined pattern. Other deposition techniques such as digital printing techniques are also possible.

The prefiring step may be preceded by a drying step. However, this step is not necessary since the water contained in the paint can evaporate during the prefiring.

After deposition of the paint composition, the coated glass sheet undergoes a prefiring step, which is intended to cure the layer of paint, so as to be able to deposit the thin layer stack thereon. The mineral paints based on alkaline silicates can usually be cured at moderate temperatures, of the order of from 200 to 250° C.

It turns out, however, that such temperatures do not always make it possible to obtain good results in terms of esthetic appearance of the layer of paint and of electrical properties of the thin layer stack. It would appear that in the event of curing at low temperature, interactions between the two coatings take place during bending. On the other hand, prefiring at at least 550° C., notably 560° C., enables the formation of a layer of paint which will not give rise to harmful interactions during the subsequent bending. Preferably, the opaque layer of mineral paint has thus undergone a prefiring step at a temperature of at least 550° C., notably of at least 580° C. and even of at least 600° C. before the deposition of the thin layer stack. This prefiring temperature is preferably not more than 650° C. This embodiment is particularly advantageous when it is necessary to achieve high electrical conductivities including in the first zone, coated with the layer of mineral paint.

Alternatively, when the electrical conduction properties are less crucial, for example when the electrically conductive thin layer is used solely for its infrared radiation reflection properties and not as a heated layer, the prefiring may be performed at lower temperatures, notably from 200 to 450° C., or even from 250° C. to 400° C., which notably makes it possible to facilitate the subsequent cutting of the glass sheet. This is also the case when the esthetic considerations are of lesser importance, for example when at least one glass sheet of the laminated glazing is highly tinted, masking any coloring associated with the interactions between the layer of paint and the thin layer stack.

The prefiring step is typically performed in a radiative oven or in a convection oven. The prefiring time is preferably between 60 and 1000 seconds, notably between 100 and 600 seconds, or even between 120 and 500 seconds.

The thin layer stack is preferably deposited, in the first zone, in contact with the layer of mineral paint, and, in the second zone, in contact with the glass sheet.

Preferably, all, or at least 90%, of the surface of the second zone is coated with the thin layer stack. Certain zones may indeed not be coated so as to make communication windows which allow waves to pass through.

In the thin layer stack, at least one, notably the or each, electrically conductive thin layer is preferably a metallic layer or a layer of a conductive transparent oxide.

The metallic layer is preferably based on silver, and notably consists of silver. Other metals such as gold or niobium are also possible. The stack may comprise a single metallic layer, or several identical or different metallic layers, for example two, three or four layers based on silver.

The physical thickness of the metallic layer or, where appropriate, the sum of the thicknesses of the metallic layers is preferably between 2 and 20 nm, notably between 3 and 15 nm.

The layer of a conductive transparent oxide is preferably based on, and notably consists of, an oxide chosen from mixed indium tin oxides (ITO), doped tin oxides, notably doped with fluorine or with antimony, and doped zinc oxides, notably doped with aluminum or with gallium.

The physical thickness of the layer of a conductive transparent oxide is preferably between 20 and 700 nm, notably between 30 and 500 nm.

In order to protect the or each electrically conductive thin layer (whether it is metallic or based on conductive transparent oxide) during the bending step, each of these layers is preferably surrounded with at least two dielectric layers. The dielectric layers are preferably based on oxide, nitride and/or oxynitride of at least one element chosen from silicon, aluminum, titanium, zinc, zirconium and tin. The thin layer stack comprises, for example, a succession of dielectric layers and of metallic layers, notably based on silver.

The step of depositing the thin layer stack is preferably performed by cathode sputtering, notably assisted with a magnetic field (magnetron process). In this technique, the glass sheet passes through a vacuum chamber, facing various targets. Under the effect of a plasma, atoms are abstracted from the target and are deposited on the glass sheet. This technique makes it possible to deposit particularly complex layer stacks, containing about 10 or more thin layers.

The abovementioned stacks have electrical conduction and infrared reflection properties that are useful for providing a heating function (deicing, demisting) and/or a heat-insulating function.

When the thin layer stack is intended to afford a heating function, current supplies must be provided. They may notably be strips of silver paste deposited by screen printing onto the thin layer stack, at two opposite edges of the glass sheet.

The laminated glazing is preferably bent. To do this, the two glass sheets of the laminated glazing, and thus the material according to the invention and the additional glass sheet, are bent, generally together.

The bending may notably be performed, for example, by gravity (the glass becoming deformed under its own weight) or by pressing, at temperatures typically ranging from 550 to 650° C. To avoid the glass sheets becoming stuck together during the bending, the glass sheets are preferably held separate by placing between them an interlayer powder which ensures a spacing of a few tens of micrometers, typically from 20 to 50 μm. The interlayer powder is, for example, based on calcium and/or magnesium carbonate. During bending, the inner glass sheet (intended to be positioned to the interior of the passenger compartment) is normally placed above the outer glass sheet.

In particular, in the case of the second embodiment described above (deposition of the coatings on large-sized glass sheets), the bending step is preferably preceded by a cutting step. This step makes it possible to obtain glass sheets having the adequate dimensions for making the laminated glazing.

The cutting step may be performed at the edge of the first zone, coated with the layer of paint, or even in the first zone. The cutting step is preferably followed by a forming step.

The lamination step may be performed by an autoclave treatment, for example at temperatures of from 110 to 160° C. and under a pressure ranging from 10 to 15 bar. Prior to the autoclave treatment, the air trapped between the glass sheets and the lamination interlayer may be removed by calendering or by pressure reduction.

The additional sheet is preferably the inner sheet of the laminated glazing, i.e. the sheet on the concave side of the glazing, intended to be positioned to the interior of the passenger compartment of the vehicle. In this way, the coatings are arranged on face 2 of the laminated glazing.

The additional glass sheet may be made of soda-lime-silica glass, or else of borosilicate or aluminosilicate glass. It may be made of clear or tinted glass. Its thickness is preferably between 0.5 and 4 nm, notably between 1 and 3 nm.

According to a preferred embodiment, the additional glass sheet is made of sodium aluminosilicate glass, which is preferably chemically reinforced, and has a thickness of between 0.5 and 1.2 mm. The additional glass sheet is preferably the inner sheet of the laminated glazing. The invention is particularly useful for this type of configuration, for which it is difficult to place the thin layer stack on face 3. The chemical reinforcement (also known as "ion exchange") consists in placing the surface of the glass in contact with a molten potassium salt (for example potassium nitrate), so as to reinforce the surface of the glass by exchanging ions of the glass (in this case sodium ions) with ions of a larger ionic radius (in this case potassium ions). This ion exchange enables the formation of compression constraints at the surface of the glass and over a certain thickness. Preferably, the surface constraint is at least 300 MPa, notably 400 and even 500 MPa, and not more than 700

MPa, and the thickness of the compression zone is at least 20 μm, typically between 20 and 50 μm. The constraint profile may be determined in a known manner by means of a polarizing microscope equipped with a Babinet compensator. The chemical tempering step is preferably performed at a temperature ranging from 380 to 550° C. and for a time ranging from 30 minutes to 3 hours. The chemical reinforcement is preferably performed after the bending step but before the lamination step. The glazing obtained is preferably a motor vehicle windshield, in particular a heated windshield.

According to another preferred embodiment, the additional glass sheet bears, on the face opposite the face turned toward the lamination interlayer (preferably face 4, the additional sheet being the inner sheet), an additional thin layer stack, notably a low-emissivity stack, comprising a conductive transparent oxide, notably indium tin oxide. The invention is also particularly useful for this type of configuration, for which it is difficult to place thin layer stacks on the two faces of the same glass sheet (faces 3 and 4). In this embodiment, the lamination interlayer and/or the additional glass sheet is tinted, the glass sheet bearing the layer of paint possibly being made of clear glass. The glazing obtained is preferably a motor vehicle sunroof.

The lamination interlayer preferably comprises at least one sheet of polyvinyl acetal, notably of polyvinyl butyral (PVB).

The lamination interlayer may or may not be tinted in order, if necessary, to regulate the optical or thermal properties of the glazing.

The lamination interlayer may advantageously have acoustic absorption properties so as to absorb sounds of aerial or structure-borne origin. To this end, it may notably consist of three polymer sheets, including two "outer" PVB sheets surrounding an inner polymer sheet, optionally made of PVB, having a lower hardness than that of the outer sheets.

The lamination interlayer may also have thermal insulation properties, in particular infrared radiation reflection properties. To this end, it may comprise a low-emissivity thin layer coating, for example a coating comprising a thin layer of silver or a coating alternating dielectric layers with different refractive indices, deposited on an inner PET sheet surrounded by two outer PVB sheets.

The thickness of the lamination interlayer is generally within a range extending from 0.3 to 1.5 mm, notably from 0.5 to 1 mm. The lamination interlayer may have a smaller thickness on one edge of the glazing than at the center of the glazing so as to avoid the formation of a double image in the case of using a head-up display (HUD) system.

The examples that follow illustrate the invention without, however, limiting it.

An opaque black layer was deposited on sheets of clear soda-lime-silica glass 2.1 mm thick (by screen printing, wet thickness: 20 to 25 μm) followed, after a step of prefiring for 3 minutes, by deposition of a thin layer stack comprising three thin layers of silver surrounded by dielectric thin layers (by magnetron cathode sputtering). After firing at various temperatures representative of temperatures used for the bending of glass (between 575 and 645° C., for 6 minutes), the sheet resistance of the thin layer stack was measured. In order to be as close as possible to industrial conditions (simultaneous firing and bending of the glass), the firing was performed by placing on the glass sheets, on the opaque black layer side, a second clear glass sheet 2.1 mm thick.

In a first comparative example A, the opaque black layer was a layer of enamel obtained by deposition of an enamel composition comprising pigments and also a bismuth glass frit. The prefiring temperature was 610° C.

In an example B according to the invention, the opaque black layer was a layer of silicate paint obtained from a composition sold by the company ICD under the reference CeramiGlass and described in U.S. Pat. No. 5,510,188. The prefiring temperature was 610° C.

In an example C according to the invention, the opaque black layer was a layer of silicate paint such as that used in example B, but the prefiring temperature was 400° C.

In the reference example D, no black layer was deposited. The thin layer stack was thus deposited directly onto the glass.

Table 1 below summarizes the sheet resistances obtained (in Ω) for each example, before firing and after firing at 575° C., 615° C. and 645° C., in the first zone.

TABLE 1

|   | —   | 575° C. | 615° C. | 645° C. |
|---|-----|---------|---------|---------|
| A | 1.7 | 3.1     | 3.6     | 9       |
| B | 1.5 | 1.0     | 1.1     | 1.2     |
| C | 1.5 | 2.9     | 7.9     | 16.0    |
| D | 1.4 | 1.0     | 1.0     | 1.0     |

Comparison of examples A and D shows that the existence of a layer of enamel in contact with the thin layer stack is harmful as regards the conductivity properties of the stack after firing, since the sheet resistance increases greatly, and does so all the more the higher the firing temperature.

On the other hand, the use of a layer of silicate paint (example B) makes it possible to conserve advantageous resistivity, of the same level as that obtained in the absence of a black layer (example D), on condition, however, that the prefiring has been performed at high temperature (example C). Low-temperature prefiring as in the case of example C is, however, not prejudicial when the electrical conduction properties in the zone covering the layer of paint are not crucial, for example when the thin layer stack is used for its infrared radiation reflection properties.

The invention claimed is:

1. A material comprising a glass sheet, one of the faces of which comprises a first zone and a second zone, only the first zone being coated with a layer of opaque mineral paint obtained from a water-based paint composition comprising pigments and an aqueous solution of alkaline silicate, the layer of opaque mineral paint and the second zone of the glass sheet being coated with a thin layer stack comprising at least one electrically conductive thin layer such that the layer of opaque mineral paint is interposed between the glass sheet and the thin layer stack.

2. The material as claimed in claim 1, wherein at least one electrically conductive thin layer is a metallic layer or a layer of a conductive transparent oxide.

3. The material as claimed in claim 1, wherein the layer of opaque mineral paint is black.

4. The material as claimed in claim 1, wherein the first zone represents between 2% and 25% of the area of the coated face.

5. The material as claimed in claim 1, wherein, in the layer of opaque mineral paint, a weight content of alkaline silicate is between 7% and 60% and a total weight content of pigments and mineral fillers is between 20% and 90%.

6. The material as claimed in claim 1, wherein the layer of opaque mineral paint has undergone a step of prefiring at a temperature of at least 550° C. before the deposition of the thin layer stack.

7. A laminated glazing comprising a material as claimed in claim 1, adhesively bonded to an additional glass sheet by means of a lamination interlayer, so that the layer of opaque mineral paint and the thin layer stack are turned toward said interlayer.

8. The laminated glazing as claimed in claim 7, wherein the additional glass sheet is made of sodium aluminosilicate glass and has a thickness of between 0.5 and 1.2 mm.

9. The laminated glazing as claimed in claim 7, wherein the additional glass sheet bears, on the face opposite the face turned toward the lamination interlayer, an additional thin layer stack.

10. A process for obtaining a material as claimed in claim 1, comprising:
  providing a glass sheet, one of the faces of which comprises a first zone and a second zone, and then
  depositing onto the first zone a water-based paint composition comprising pigments and an aqueous solution of alkaline silicate, and then
  prefiring at a temperature of at least 200° C., so as to obtain a layer of mineral paint, and then
  depositing, onto the layer of mineral paint and onto the second zone of the glass sheet, a thin layer stack comprising at least one electrically conductive thin layer.

11. The process as claimed in claim 10, wherein the prefiring is performed at a temperature of at least 550° C.

12. The process as claimed in claim 10, wherein the depositing the water-based paint composition is performed by screen printing.

13. The process as claimed in claim 10, wherein the depositing of the thin layer stack is performed by cathode sputtering.

14. A process for obtaining a laminated glazing as claimed in claim 7, comprising:
  providing a material obtained according to the process of claim 10 and an additional glass sheet, and then
  bending the material and of the additional glass sheet, and then
  laminating said material with the additional glass sheet by means of a lamination interlayer, so that the layer of mineral paint and the thin layer stack are turned toward said interlayer.

15. The process as claimed in claim 14, wherein the bending is preceded by a step of cutting the material.

16. The material as claimed in claim 2, wherein the metallic layer is based on silver.

17. The material as claimed in claim 3, wherein the lightness $L^*$ of the material measured in reflection on the glass side is less than 5.

18. The material as claimed in claim 4, wherein the first zone represents between 3% and 20% of the area of the coated face.

19. The laminated glazing as claimed in claim 7, wherein the laminated glazing is a motor vehicle windshield or sunroof.

20. The laminated glazing as claimed in claim 8, wherein the additional glass sheet is chemically reinforced.

* * * * *